United States Patent Office 2,869,844
Patented Jan. 20, 1959

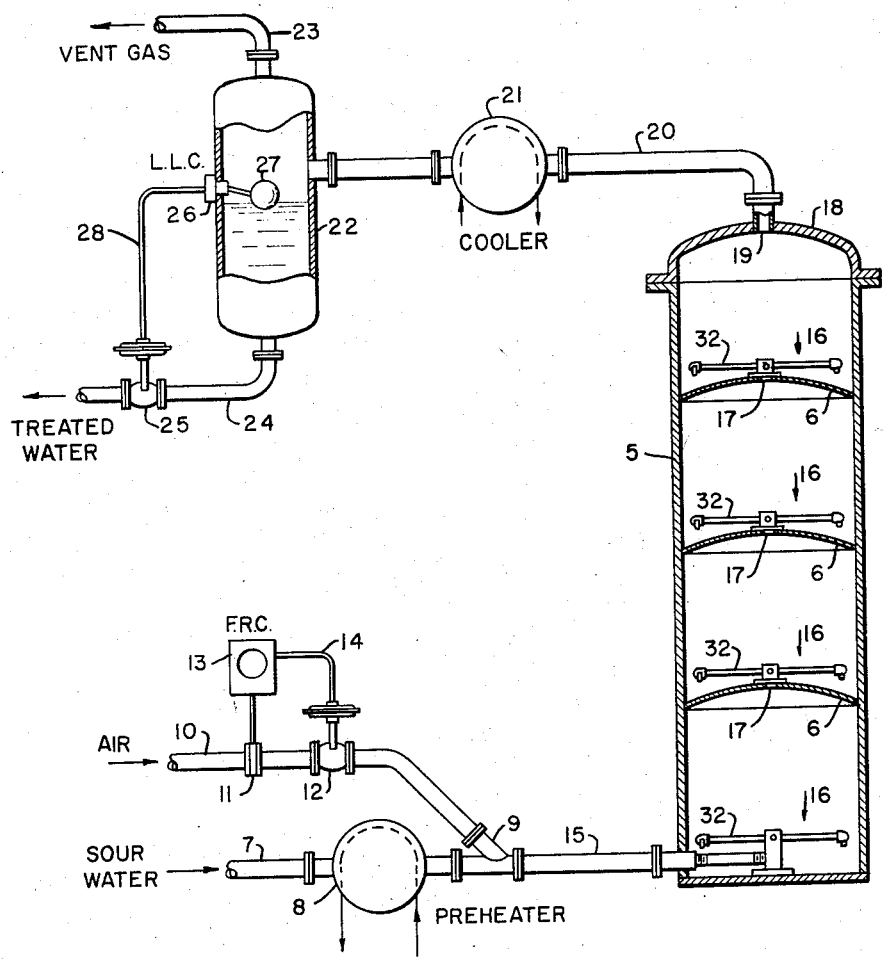
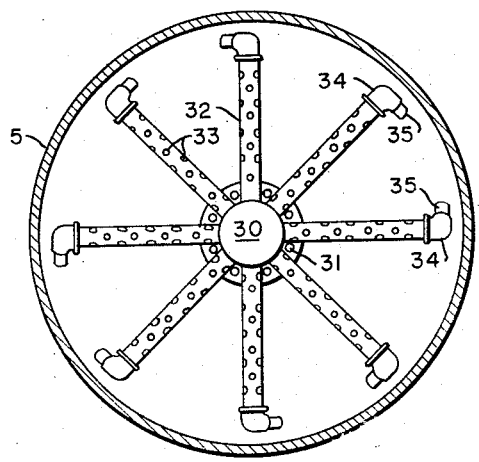
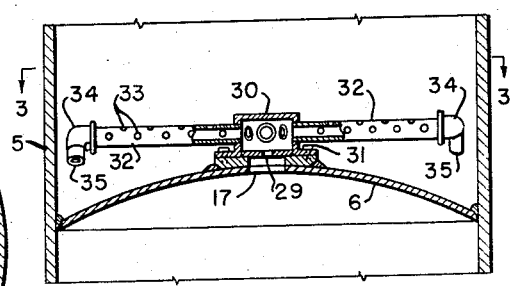

2,869,844

TREATING LIQUID WITH GAS

Samuel B. Thomas, Long Beach, Calif., assignor to Shell Development Company, New York, N. Y., a corporation of Delaware Application April 16, 1956, Serial No. 578,256

3 Claims. (Cl. 261—21)

The present invention relates to an improved method and apparatus for treating a liquid with a gas by concurrent flow wherein no internal power-driven elements are used. The method and apparatus are of general applications, one specific process being treatment of waste aqueous solution containing sulfur, such as ammonium sulfide, with air at elevated temperature and pressure to convert the sulfide primarily to thiosulphate prior to disposal of the aqueous solution; this treatment is described in the joint patent application of the inventor herein and Samuel York, filed in the United States on March 23, 1955, Serial No. 496,314. A further example of a process to which invention can be applied is the regeneration, by means of oxygen-containing gas, such as air, of spent solutions (such as soda, "Solutizer solution" or "Doctor solution") used to remove undesirable sulphur compounds from hydrocarbon oils.

In processes wherein a gas is dispersed within a liquid to effect intimate contact several problems are often encountered, namely, the subdivision of the gas into sufficiently small bubbles to attain a large surface, the distribution of the bubbles to insure contact with all parts of the liquid, and the maintenance of the dispersion for a sufficient time to permit the treatment to be completed despite the tendency of the ascending bubbles to coalesce to form larger globules having a detrimentally reduced total surface.

When a prolonged contact time is required the gas is sometimes dispersed at the bottom of a tall column, through which the liquid may also flow vertically, to extend the time required for the ascending bubbles to rise to the liquid surface. Unfortunately the small bubbles or froth coalesce in rising through a column which is empty save for the gas and liquid and the subsequent contact between these fluids is poor. Moreover, natural circulation of the liquid in such an empty column produces channeling or short circuiting. This action leads to unequal residence times for various portions of the liquid, and untreated or ineffectively treated liquid reaches the liquid outlet.

Liquid circulation within the column can be restricted to some extent by installing packing, baffles, grids, or the like. However, it has been observed that such expedients do not produce as effective a dispersion of the gas as is desirable and, in fact, often act to coalesce the gas bubbles into larger globules.

The foregoing difficulties can be overcome by using a series of treaters through which the gas and liquid flow concurrently. Such installations have, however, heretofore provided for separate connections for the gas and liquid and have been costly to install.

It is an object of this invention to provide an improved method and apparatus for effecting continuous, concurrent contact between a liquid and a gas wherein the above-mentioned shortcomings are overcome by flowing the gas and liquid through a series of separate contacting zones or stages and redistributing the gas and liquid within each stage.

A further object is to provide an improved apparatus for carrying out the method according to the foregoing object which achieves the steady flow of both the gas and liquid between stages in contact with one another and essentially without slug flow.

Further objects will be apparent from the following description.

In summary, according to the invention the gas and liquid are flowed concurrently through a series of separate, confined, preferably superposed contacting zones within each of which a pool of the liquid is maintained, by admitting the gas and liquid continuously into each zone as submerged jets, and withdrawing the gas and liquid continuously from each stage, in contact with one another by guiding the gas collected at the top of each zone to move with a lateral and upward motion toward the outflowing liquid stream and immediately commingling the gas with the outflowing liquid. By operating in this manner the gas is prevented from accumulating as large globules which are maintained in part by interfacial tension and which break at intervals to produce unsteady or slug type of flow. The method of operation makes it possible to simplify the redistributions since both the liquid and gas are handled together. The method effects repeated redispersion of the gas within the liquid, thereby insuring the presence of small bubbles throughout the treatment and affording the possibility of providing any desired contacting time by using a sufficient number of contacting zones; the liquid is redispersed, thereby breaking up those flow patterns that tend to channelling; and the use of repeated submerged gas jets at the lower parts of the zones makes it possible to employ empty chambers, wherein the tendency of the gas bubbles to coalesce is minimized.

Apparatus according to the invention for carrying out the method includes a series of chambers, which may be superposed compartments within a vertical column, each having near the bottom thereof a distributing device suitable for receiving a mixed flow of gas and liquid from a preceding (usually lower) stage of the series and for dispersing the gas and liquid as a plurality of submerged jets, each chamber (with the possible exception of the last in the series) having at the top thereof an inclined roof which is advantageously conical or dome-shaped and has a discharge opening for gas and liquid at an elevated and, preferably, the highest part thereof, said inclination serving to deflect gas which is coalesced on the underside of the roof with a lateral motion to the said discharge opening and directly into the stream of liquid which flows through the opening, the said discharge opening being in communication with the inlet of the distributor of the next chamber for the flow of both gas and liquid. By this construction the gas and liquid flow smoothly from the top of the compartment in a mixed stream and alternating or slug flow, which would occur were gas collected under a horizontal surface, is effectively avoided or minimized. The distributor is advantageously of the type which has a plurality of gas-orifices and one or more openings through which normally only liquid is discharged but which can also discharge gas when supplied at rates greater than the capacity of the gas orifices, to effect smooth flow of the gas and liquid and prevent "dumping" of the gas through the first perforations encountered.

The invention will be further described with reference to the accompanying drawing forming a part of this specification and showing one preferred embodiment, wherein:

Figure 1 is a vertical sectional view of a contacting column in accordance with the invention, certain specific flow connections and auxiliary units used for the treatment of sour water with air being shown diagrammatically;

Figure 2 is an enlarged detail view of a portion of the column of Figure 1; and

Figure 3 is a sectional view taken on the line 3—3 of Figure 2.

Referring to Figure 1, the contacting column 5 is provided with a plurality of dome-shaped partitions 6 which divide the column into superposed compartments or chambers, each of which serves as a separate contacting zone. As used, for example, for the treatment of waste sour water containing ammonium sulfide with air at superatmospheric pressure, the water is admitted by a feed pump (not shown) at 7, preheated in a preheater 8, and commingled at 9 with air which is supplied under suitable pressure from a supply pipe 10 via a flow sensing element 11 and a flow control valve 12 which may be operated automatically through a flow recording controller 13 in response to a signal through a control line 14. The commingled air and water enter the bottom of the lowermost compartment of the column via pipe 15 and a multi-jet distributor 16 (which is described hereinafter), ascend through the compartment with the gas bubbles ascending in relation to the water, and flow out through a discharge opening 17 at the highest part of the partition, which constitutes a sloping roof for the compartment. Both the gas and liquid flow through the discharge opening into a second and identically constructed distributor in the second compartment; the flow is the same in each compartment. The gas and liquid are withdrawn from the uppermost compartment, the top wall 18 of which is likewise dome-shaped and has a discharge opening 19 at the highest part, and flow through a pipe 20 and cooler 21 to a separating unit 22. This unit is shown diagrammatically to have a gas outlet pipe 23 at the top, by which the separated gas can be fed to a furnace, a water draw-off pipe 24 at the bottom, by which the separated, treated water can be discharged at a rate determined by a flow control valve 25, and a liquid level controller 26 which senses the liquid level 27 within the tank and automatically actuates the valve 25 through a control line 28.

The construction by which the smooth redistribution of gas and liquid is effected will now be described in detail with references to Figures 2 and 3 of the drawing. It will be noted that each distributor includes a distributor-inlet 29, which may take the form of an orifice, as shown, in a plate at the bottom of a feed or distributing chamber 30 and which is in communication with the discharge opening 17 at the highest part of the dome-shaped partition 6. The feed chamber may be secured to the partition by bolts 31 and has a plurality, e. g., eight, horizontal distributing pipes 32 which communicate at their inner ends with the feed chamber and which have gas-discharge perforations 33 on their upper surfaces, some perforations being directed upwardly and others having inclined axes. These perforations are preferably distributed as to number and/or varied as to size, e. g., made larger toward the outer ends, to attain substantially uniform distribution of gas over the column cross section. The ends of the pipes 32 have openings which are larger than the perforations 33 and are preferably situated at a level somewhat below the pipe axis, although this is not in every case essential. One mode of providing such depressed outlets is to thread elbows 34 at the pipe ends and fit nipples 35 thereto; rotation of the elbows permits the depths of open ends of the nipples to be adjusted. When the nipples do not extend vertically downwards it is desirable to arrange adjacent nipples in opposed relation, as shown in Figure 3, so as to oppose any whirling motion of the liquid such as would tend to coalesce the gas bubbles.

Because the distributing chambers 30 contain both gas and liquid and it is desired to distribute these fluids in like ratio among the several pipes 32, it is advantageous to have some turbulence within the distributing chamber. This can be insured by providing a sufficiently high entrance velocity; when low or moderate flow rates are employed it is useful to constrict the orifice 29 as shown to induce such velocity and turbulence.

In operation, liquid fills each compartment and ascends slowly, while the gas bubbles rise more rapidly. Each compartment is otherwise empty and of limited height, so that the ascending gas bubbles are not greatly coalesced prior to impinging against the undersides of the inclined partitions 6 or the roof 18. They move laterally and upwards along this inclined surface toward the opening 17 or 19 and in doing so become coalesced; the coalesced gas then flows directly and steadily into the said opening 17 or 19, together with liquid which is simultaneously flowing upward through the opening. By thus feeding the gas continuously from the side of the merging liquid current both gas and liquid are discharged steadily, substantially at the rates at which they are supplied to the distributor, and slug flow is substantially avoided.

Within the distributor pipes 32 a separation between gas and liquid occurs, although this may not be complete, and the flow is predominantly stratified. As a consequence mainly gas escapes upward through the perforations 33, which is dispersed as small bubbles throughout the liquid, while the liquid escapes from the terminal openings in nipples 35. By disposing these terminal openings at a level below the axes of the pipes 32 a slight liquid back-pressure is built up which can vary and becomes greater at increased gas flow rates; this tends to insure discharge of all the gas through all the perforations 33 over a range of flow rates and prevents excessive discharge of gas through the innermost perforations. When the gas flow rate exceeds the said range some gas flows out through the terminal openings, together with liquid. This feature limits the total pressure drop which can be developed in a distributor by increased gas flow rates.

The column 5 is made tall enough to provide sufficient contact time between the air and water to convert the sulfide in the water to thiosulfate. The air is maintained in a state of subdivision and intimate mixture thereof with all parts of the liquid is insured by leading the gas at the top of each compartment to the highest part thereof without the presence of any pocket wherein any gas globule can collect, and discharging it thence with steady flow into the next higher distributor, together with water which is withdrawn from the top of the pool which fills the compartment to the top save for the gas moving along the underside of the partition. Gas is then injected as a multitude of submerged jets into the pool in the next higher compartment, and the water is also injected as a plurality of submerged jets. By thus repeatedly redistributing both the gas and the water channelling is avoided. A particular feature of the invention is the discharge of the gas and liquid through a common outlet, as a mixed stream, while nevertheless substantially avoiding intermittent or slug flow of either of the fluids. This greatly simplifies the construction, obviates the need for gas-liquid separations at each stage, and makes the unit more compact.

The effectiveness of the construction is illustrated by comparative tests performed in two vertical contactors two inches in diameter and 20 inches high, one having no partitions between the top and the bottom and the other, illustrative of the invention, having a single 30° frusto-conical partition with an opening at the top connected to a distributor in the form of a ¼-in. O. D. tube, ½ inch long. Water containing sulfide was admitted at the rate of 200 cc. per min., at a pressure of 60 lbs. per sq. in. gauge together with air at a rate of 0.31 standard cu. ft. per min. The contactor temperature was about 200° F. The sulfide content of the water, expressed as parts per million per pass, was determined after each pass and the sulfide oxidation rate was determined. It was found that use of the partition and redistributor resulted in a 23% increase in the oxidation rate.

I claim as my invention:

1. Apparatus for the continuous treatment of a liquid with a gas concurrently within a series of contacting stages which comprises: a series of vertically superposed, enclosed contacting chambers each of which is adapted to be substantially filled with a separate pool of liquid and contains near the bottom thereof a distributor having a bottom inlet, said chambers being otherwise empty throughout the major parts of the heights thereof, each said chamber except the uppermost having a sloping roof which is situated wholly beneath the distributor of the next higher chamber and has at the highest part thereof an outlet opening extending over only a minor part of the chamber area and is continuously in upward communication with the inlet of the said higher distributor, said outlet openings being the only passageway interconnecting consecutive chambers of the series, each said distributor including confined duct means extending laterally from the said bottom inlet thereof and having a plurality of discharge openings situated higher than the said bottom inlet and distributed over the chamber area for the discharge of fluid as a plurality of submerged jets, means for supplying said gas and liquid continuously to the distributor inlet of the lowermost chamber, and means for discharging gas and liquid from the uppermost chamber.

2. Apparatus according to claim 1 wherein said distributing means includes a hollow body having an inlet through which the gas and liquid enter, said body having at least one terminal opening through which the liquid is discharged for the greater part and which is horizontally remote from said inlet and a plurality of outlet openings smaller than said terminal opening distributed between said inlet and the terminal opening through which primarily gas is discharged.

3. Apparatus for the continuous treatment of a liquid with a gas concurrently within a series of contacting stages which comprises: a vertical column; a plurality of partitions within said column subdividing the column into compartments adapted to be substantially filled with said liquid, each said partitions sloping to a highest point at an inner part thereof; a distributor at the bottom of each compartment having an inlet through which said liquid and gas are supplied, a plurality of small gas discharge openings distributed over the column area, and larger terminal liquid discharge openings remote from the inlet and at a level beneath that of said small openings, each said inlet of the distributor of each compartment above a partition being in communication with the highest part of the pocket defined beneath the said partition, means for supplying said gas and liquid continuously to the distributor inlet of the lowermost compartment; and means for discharging gas and liquid from the uppermost compartment.

References Cited in the file of this patent

UNITED STATES PATENTS

| | | |
|---|---|---|
| 363,173 | Schenck | May 17, 1887 |
| 1,209,490 | Pindstoffe | Dec. 19, 1916 |
| 1,214,103 | Williams | Jan. 30, 1917 |
| 1,436,886 | Leibing | Nov. 28, 1922 |
| 2,721,064 | Reichardt | Oct. 18, 1955 |

FOREIGN PATENTS

| | | |
|---|---|---|
| 11,907 | Great Britain | Sept. 20, 1886 |